United States Patent [19]

Spence-Bate

[11] 4,080,070
[45] Mar. 21, 1978

[54] RECORD COPYING PLATEN

[76] Inventor: Harry Arthur Hele Spence-Bate, 1 Cheam Place, Morley, Australia, 6062

[21] Appl. No.: 729,768

[22] Filed: Oct. 5, 1976

[30] Foreign Application Priority Data

Oct. 10, 1975 United Kingdom ............... 41651/75

[51] Int. Cl.$^2$ ............................................. G03B 27/62
[52] U.S. Cl. ................................................... 355/75
[58] Field of Search ....................... 355/50, 55, 60, 75, 355/63

[56] References Cited

U.S. PATENT DOCUMENTS

| 1,267,358 | 5/1918 | Beidler | 355/75 X |
| 2,323,600 | 7/1943 | Heybourne | 355/60 |

FOREIGN PATENT DOCUMENTS

| 683,125 | 10/1939 | Germany | 355/75 |
| 455,325 | 2/1950 | Italy | 355/75 |
| 490,899 | 8/1938 | United Kingdom | 355/63 |

Primary Examiner—Donald A. Griffin
Attorney, Agent, or Firm—Fidelman, Wolffe & Waldron

[57] ABSTRACT

A record copying platen suitable for copying records such as a book where part of the record is of a different thickness to the other part, the platen consisting of two separable platen members each constrained to lie next to each other in parallel planes, the distance between the planes being variable; in one embodiment the platen members are linked by a parallel link arrangement, one of the links being pivotally mounted to a base and in which the pivot can be moved along that link so as to enable the device to balance with more weight on one platen member than the other; a second embodiment has a resilient arrangement to urge the platen members upwards, and a further resilient means for assisting the upward bias of the platen members and the further resilient means has an adjustment for adjusting the tension in the means so that different weights of record can be accommodated and the platen members urged upwards into a copying plane; a third embodiment has a hydraulic arrangement for urging the platen members upwards and for balancing the platens, the hydraulic arrangement consisting of a cylinder under one platen connected to a similar cylinder under the other platen, an adjustment arrangement to cater for different heights of record being provided by means of a third cylinder having an adjustment piston which can be locked in several positions.

11 Claims, 3 Drawing Figures

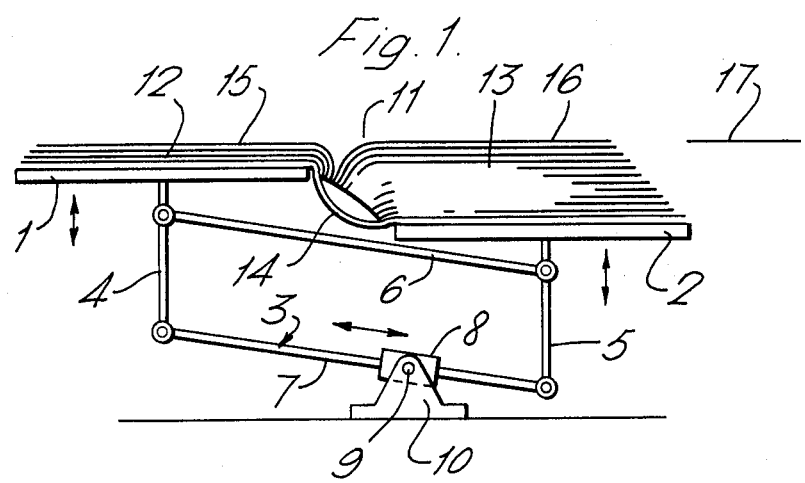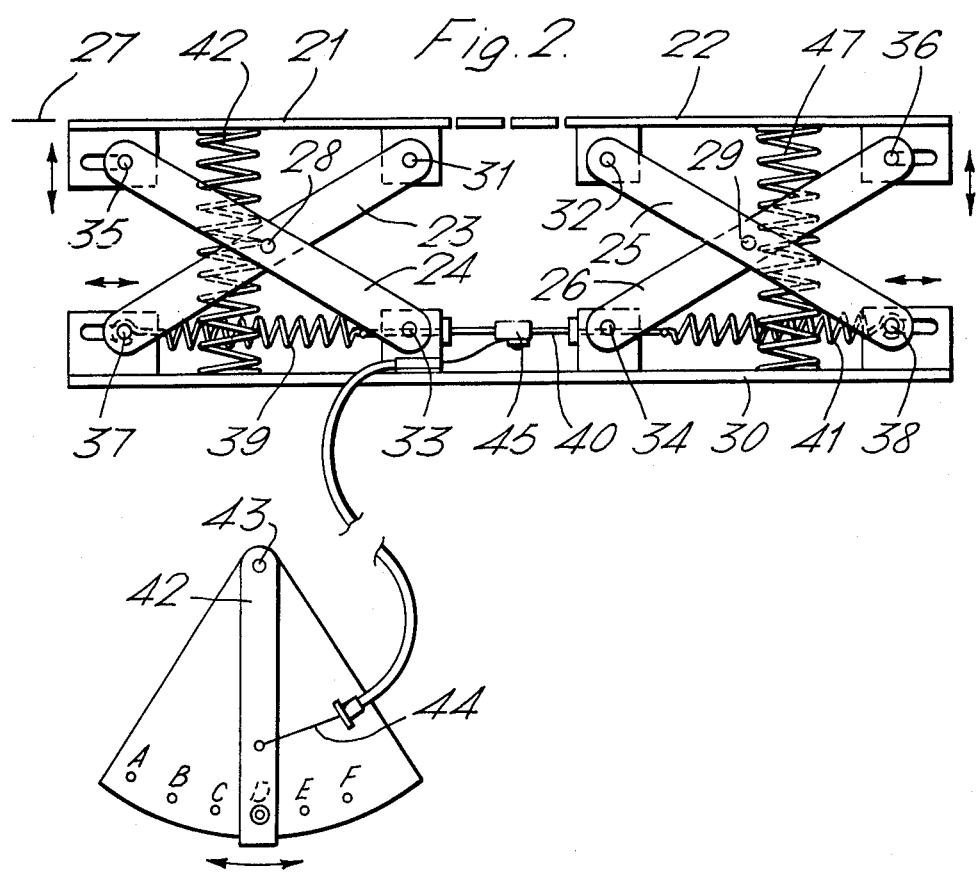

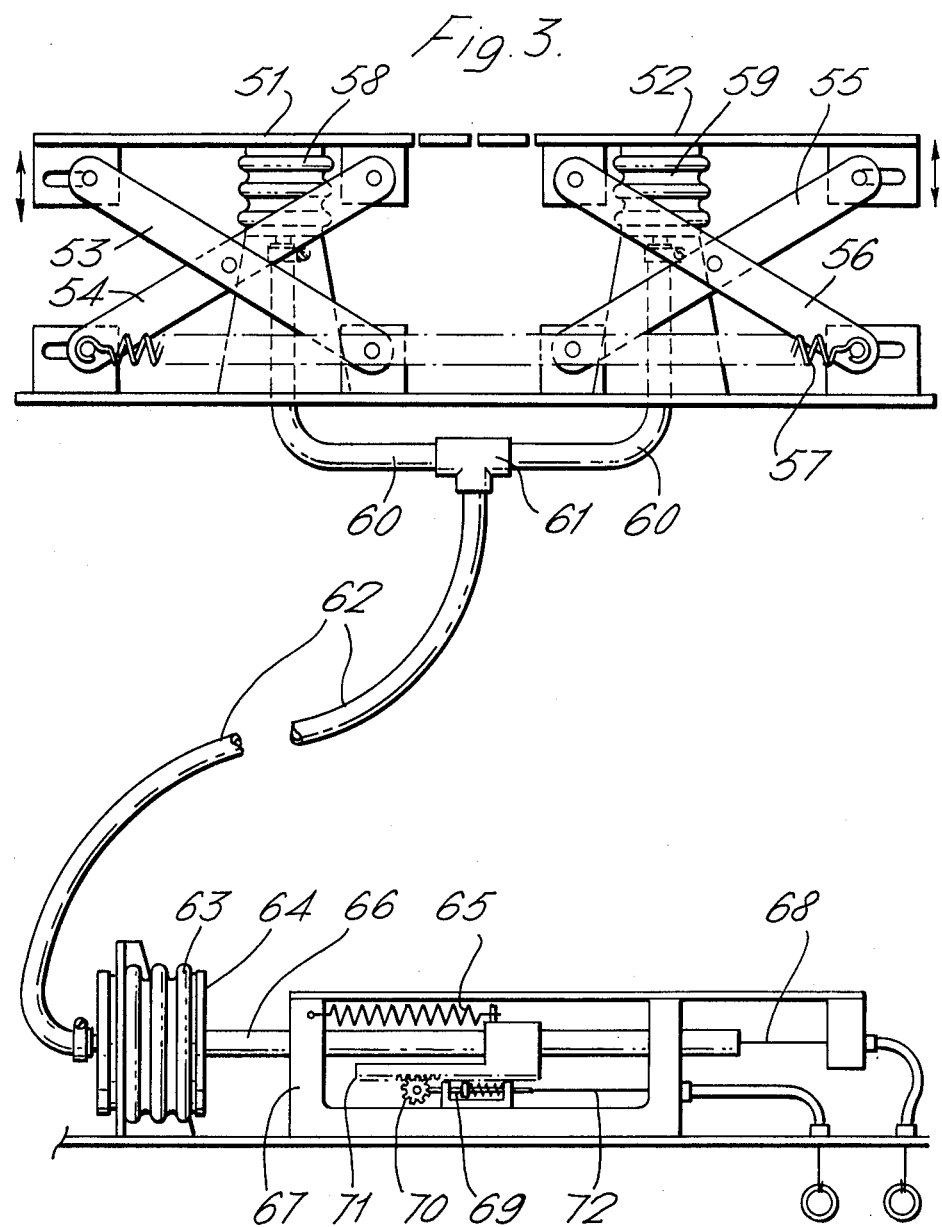

RECORD COPYING PLATEN

The present invention relates to a record copying platen suitable for copying records such as books by photographic or other copying processes.

When copying records it is often a requirement to copy a record such as a book. The problem of copying a book is that the copying surface is uneven due to the binding of the book and/or the fact that one may be copying a page or pages at say a quarter of the way through the book. Thus in order to attempt to eliminate this unevenness it is often necessary to place another book or books under one part or both parts of the book copied to build up a level copying surface. Such a method is clearly clumsy and in any event results only at the best in a relatively uneven copying surface.

Accordingly there is provided according to the invention a record copying platen comprising two platen members, the one constrained to lie in a plane parallel to the other by balancing means.

Preferably the balancing means includes a biasing means which allows for different thicknesses of books.

The balancing means may be a lever linking arrangement, a spring linking arrangement or a hydraulic linking arrangement.

The invention will now be described with reference to the accompanying drawings, in which:

FIG. 1 shows a first embodiment of the invention having a lever linked balancing means;

FIG. 2 shows a second embodiment of the invention having a spring linked balancing means; and FIG. 3 shows a third embodiment of the invention having a hydraulic linked balancing means.

FIG. 1 shows a first embodiment of the invention in which two platen members 1 and 2 are mounted on a parallel linkage mechanism 3. The mechanism 3 comprises two vertical arms 4 and 5 on to which the platen members are horizontally fixed and two parallel links 6 and 7 which constrain the platen members 1 and 2 to lie in a plane parallel to one with the other. The lower link 7 is slidably mounted on a pivot member 8 which is pivotted at 9 on a bracket 10. A book 11 can be seen resting on the platen members 1 and 2 with the thinner portion 12 of the book 11 on platen member 1, the thicker portion 13 of the book 11 on the platen member 2 and the spine 14 of the book 11 between the platen members 1 and 2 in a gap suitably provided between the platen members.

The pivot 9 of the mechanism 3 can be adjusted as may be seen in FIG. 1 so that in the event of the thicker portion 13 being much heavier than the thinner portion 12 the upper pages 15 and 16 of the book rest in a common plane 17. In order to assist the mechanism to ensure pages 15 and 16 are in common plane a flat glass plate can be placed on top of the pages 15 and 16 or else a flat open frame can be placed to bear on the edges of the pages. The frame or plate can be suitably marked or dimensioned so as to indicate the extent of the front focal plane of the camera in which the whole record copying platen is fitted. Suitable locking means can be provided to lock both platen members in a plane parallel to plane 17, and means can be provided to raise or lower the whole record copying platen so as to ensure the platen members bring the record to be copied precisely into the front focal plane of the camera.

In FIG. 2 there is shown a second record copying platen according to the invention which is effectively similar to the platen of FIG. 1 but which is operated by springs. In this second arrangement two platen members 21 and 22 are constrained by pairs of scissor links 23, 24 and 25, 26 to lie in a plane parallel the one with the other parallel to a front focal plane 27 of a camera in which the platen is fixed. Each pair of links 23, 24 and 25, 26 is pivotted centrally at 28 and 29 respectively. The inner extremities of the links 23, 24 and 25, 26 are pivotally connected to inner ends of the platen members 21, 22 and to a base plate 30 at points 31, 32 on members 21 and 22 and points 33, 34 on plate 30 respectively. The outer extremities of the links 23, 24 and 25, 26 are both pivotally and slidably connected to the outer ends of the platen members 21, 22 and to the base plate 30 at points 35, 36 on members 21 and 22 and points 37, 38 on plate 30 respectively. The outer extremities of links 23 and 25 are inter-connected by a first spring 39 connected to a sliding bar 40 and a second spring 41 so that the outer extremities of links 23 and 25 are pulled together and the platen members 21 and 22 are urged upwards.

The tension of springs 39 and 41 can be increased or decreased by moving a tensioning control 42 pivotted at 43 between positions A to F. The control 42 pulls a Bowden cable 44 which in turn pulls a tensioning slide 45 which effectively shortens or lengthens sliding bar 40. Position F used for thickest books and position A for the thinnest books.

Further compression springs 46 and 47 act between platen members 21, 22 and base plate 30 to assist in urging the platen members upwards.

It will be appreciated that in operation as platen member 21 is pushed down the tension spring 39 acts through sliding bar 40 and tension spring 41 to pull the foot of link 25 towards the foot of link 24 and thereby raise the platen member 22.

In FIG. 3 there is shown a third record copying platen according to the invention which has a similar scissors link arrangement to the platen shown in FIG. 2 and this link arrangement need therefore not be explained in detail sufficing to mention that parallel platen members 51 and 52 are provided with scissor links 53, 54, 55 and 56 and that the outer lower ends of links 54 and 56 are linked by a single tensioning spring 57.

Instead of the spring balancing arrangement of the second copying platen the platen members 51 and 52 are linked for vertical movement by hydaulic piston and cylinder arrangements 58 and 59 via a first flexible hose 60. At T junction 61 is provided in the hose 60 between the cylinders to which is connected second flexible hose 62. The second hose 62 is connected in turn to a cylinder 63 in the form of a corrugated sealed bag which acts on a piston 64 under the influence of a tensioning spring 65 which acts between piston rod 66 and frame 67. Also acting on the piston rod 66 is an adjusting cable 68 which can be set to pull against the spring 65 to reduce to upward action of both platen members 51 and 52. The piston rod 66 can also be locked by means of a sprung pawl 69 which locks pinion 70 which in turn engages on rack 71 fixed to the piston rod 66. The pawl 69 can be disengaged by means of a cable 72.

It may be convenient to provide a translucent platen which can be mounted to the base of either embodiment which can clamp a record between its lower surface and the upper surface of the platen members so that a record is held flat under the lower surface of the translucent platen. This translucent platen can be downwardly biased so as to complement or be instead of the upper biasing arrangement of the springs 42 and 47 in the second embodiment. Such an arrangement would assist in a copying camera in ensuring that the record was in the object plane of the camera lens.

We claim:

1. A record copying platen for copying a record comprising a base and mounted to said base two platen members, each mounted for movement to or away from said base, the one platen constrained to lie in a plane parallel to the other by a balancing means interconnecting said platen, said balancing means comprising two parallel links mounted to the platen members, one of said links being slidably mounted to a pivot mounted on said base so as to provide a biasing means whereby the platens can be balanced with a different weight on each platen.

2. A platen as claimed in claim 1 including a translucent platen mounted to said base so as to clamp a record between its lower surface and the upper surface of the platens.

3. A record copying platen for copying a record comprising a base and two platen members mounted on cross links for movement to or away from said base and having means to urge the platens into an upper position, said cross links pivotted to each other at the point of crossing, the lower end of each outwardly facing link being slidably mounted to said base and interconnected by a resilient means whereby the one platen is constrained to lie in a plane parallel to the other.

4. A platen as claimed in claim 3 wherein said means to urge the platens into an upper position comprises spring means.

5. A platen as claimed in claim 3 wherein means are provided for adjusting the tension of the resilient means.

6. A platen as claimed in claim 3 including a translucent platen mounted to said base so as to clamp a record between its lower surface and the upper surface of th platens.

7. A record copying platen for copying a record comprising a base and two platen members constrained to lie in a plane parallel to each other and mounted on cross links for movement to or away from said base, said cross links pivotted to each other at the point of crossing, and means to urge the platens into an upper position, said means comprising a cylinder for each platen, each cylinder being interconnected.

8. A platen as claimed in claim 7 wherein the lower end of each outwardly facing link is slidably mounted to the said base and each lower end is interconnected by a resilient means.

9. A platen as claimed in claim 7 wherein there is connected to each cylinder a further cylinder, the pressure in which can be adjusted by an adjustment means.

10. A platen as claimed in claim 9 wherein the adjustment means is provided with a releasable lock so as to hold the adjustment means in a plurality of positions, whereby the pressure in the platen cylinders can be adjusted.

11. A platen as claimed in claim 7 including a translucent platen mounted to said base so as to clamp a record between its lower surface and the upper surface of the platens.

* * * * *